(12) United States Patent
Liu

(10) Patent No.: US 7,000,929 B1
(45) Date of Patent: Feb. 21, 2006

(54) WHEELBARROW LEG STABILIZER STRUCTURE

(75) Inventor: Zhijun Liu, Qingdao (CN)

(73) Assignee: Qingpao Huatian Handtruck Corporation, LTD, Qingdao (CH)

( * ) Notice: Subject to any disclaimer, the term of this patent is extended or adjusted under 35 U.S.C. 154(b) by 1 day.

(21) Appl. No.: 10/973,711

(22) Filed: Oct. 25, 2004

(51) Int. Cl.
*B62B 1/18* (2006.01)

(52) U.S. Cl. .................................................. 280/47.31
(58) Field of Classification Search ............. 280/47.31, 280/47.12, 47.18, 47.26, 655, 656, 767; 298/3; D34/12–27
See application file for complete search history.

(56) References Cited

U.S. PATENT DOCUMENTS

| | | | |
|---|---|---|---|
| 264,720 A | 9/1882 | Loomis | 280/47.33 |
| 2,598,682 A | 6/1952 | Giovannoni | 280/14 |
| 5,031,926 A | 7/1991 | Wannamaker | 280/47.2 |
| 5,791,667 A | 8/1998 | Knoll | 280/47.19 |
| D404,882 S | 1/1999 | Shuchart et al. | D34/27 |
| D404,883 S | 1/1999 | Shuchart et al. | D34/27 |
| D408,607 S | 4/1999 | Shuchart et al. | D34/27 |
| D408,955 S | 4/1999 | Shuchart et al. | D34/27 |
| 6,017,053 A | 1/2000 | Leger et al. | 280/653 |
| D487,833 S | 3/2004 | Parker | D34/27 |
| 6,869,098 B1 | 3/2005 | Tomchak et al. | 280/653 |
| 2002/0130491 A1 | 9/2002 | Abel | 280/653 |
| 2005/0012285 A1 | 1/2005 | Davis | 280/47.31 |

*Primary Examiner*—J. Allen Shriver
(74) *Attorney, Agent, or Firm*—Jack C. Munro

(57) ABSTRACT

A stabilizer structure to be attached to the supporting legs of a wheelbarrow. The stabilizing structure comprises a pair of stabilizers each of which includes a horizontal section and a vertical section. Each leg of the wheelbarrow is fixedly secured to a horizontal section of a said stabilizer with the leg abutting against the vertical section of the stabilizer.

1 Claim, 2 Drawing Sheets

WHEELBARROW LEG STABILIZER STRUCTURE

BACKGROUND OF THE INVENTION

1. Field of the Invention

This invention relates to load carrying structures and more particularly to a stabilizer for the leg of a wheelbarrow to distribute the weight over a wider area that the leg of the wheelbarrow is subjected to.

2. Description of the Related Art

Wheelbarrows have long been used by homeowners and people in the construction trade. The function of a wheelbarrow is to move material from one location to another. The material is placed within the tray of the wheelbarrow and the user is to physically lift a handle structure with the majority of the weight of the wheelbarrow resting on a wheel and the wheelbarrow is then rolled from one location to another. At arriving at the destination location, the wheelbarrow is to be tipped dumping the material from the tray of the wheelbarrow.

Wheelbarrows can be used to move a substantial amount of weight. It is not uncommon for a wheelbarrow to contain between one-hundred and two-hundred pounds of material. Typically, the legs of the wheelbarrow, which are located in the aft direction away from the wheel of the wheelbarrow, comprise a pair of thin members with the lower end of each leg defined as the base to rest on the supporting surface. Typically, the supporting surface may be unstable, such as loose dirt. Because of the narrowness of the legs and the weight that the wheelbarrow is subjected to, it is not at all uncommon for the wheelbarrow to tip over.

It is desirable to design some form of a structure that could stabilize the legs of a wheelbarrow to eliminate any possibility of tipping over of the wheelbarrow as material is being deposited within the confines of the tray of the wheelbarrow.

SUMMARY OF THE INVENTION

The basic embodiment of the present invention is a wheelbarrow which has a frame and a wheel mounted on the frame. The wheelbarrow has handle structure which is also mounted on the frame. A tray is also mounted on the frame with the tray adapted to contain material to be moved. A pair of legs are mounted on the frame with each of the legs being channel shaped forming a longitudinal channel. Each of the legs has a base with the base adapted to rest on a supporting surface. There is to be mounted on each base of each leg a stabilizer in the form of a sheet material plate which has a horizontal section and a vertical section. A base of each leg is to be fixedly secured to the horizontal section with there being a separate stabilizer for each leg.

A further embodiment of the present invention is where the basic embodiment is modified by defining that the horizontal section is flat.

A further embodiment of the present invention is where the basic embodiment is modified by defining that the vertical section is located at a ninety degree angle relative to the horizontal section.

A further embodiment of the present invention is where the basic embodiment is modified by defining that the vertical section is located against the exterior surface of the leg.

A further embodiment of the present invention is where the basic embodiment is modified by defining that there is a strengthening member inserted within each channel of each leg.

A further embodiment of the present invention is where the just previous basic embodiment is modified by there being defined two strengthening members for each leg.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
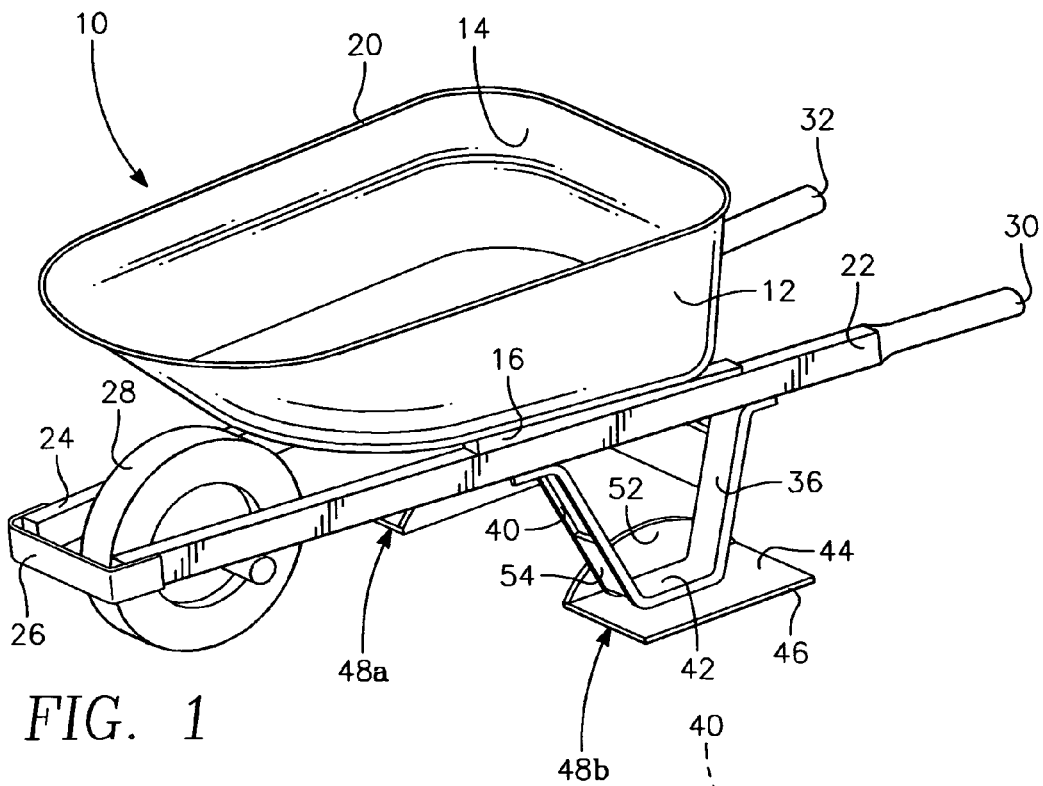
FIG. 1 is a frontal direction isometric view of a wheelbarrow upon which has been mounted the stabilizer structure of the present invention.
Figure 2:
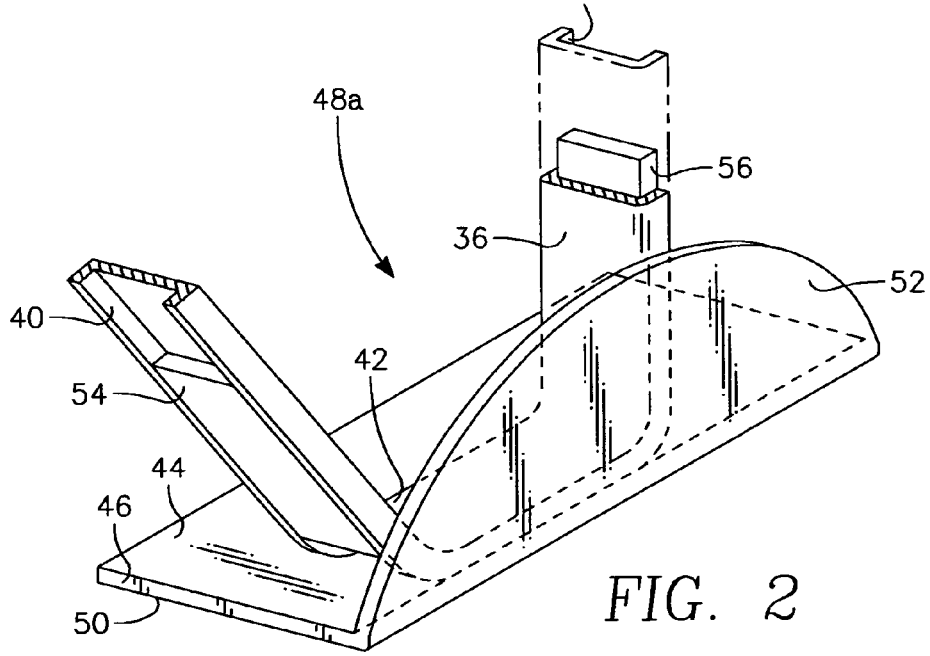
FIG. 2 is an enlarged isometric view of the lower portion of one of the legs of the wheelbarrow clearly depicting the stabilizer as to how it is mounted in conjunction with the leg.

Referring particularly to the drawings, there is shown a wheelbarrow 10. The wheelbarrow 10 has a tray 12 which has a material receiving compartment 14. Material that is to be moved from one locale to another, such as dirt, sand, rock, brick, etc., is to be deposited within the compartment 14. The bottom surface of the tray 12 is mounted against a pair of shims 16 and 18. The upper surface of each shim 16 and 18 is to be substantially horizontal when the wheelbarrow 10 is in a resting condition. This will cause the peripheral edge 20 of the tray 12 to be located in a horizontal position.

Shim 16 is fixedly secured onto bar 22. Shim 18 is fixedly secured onto bar 24. Bars 22 and 24 form a part of the frame for the wheelbarrow 10. This frame also includes a cross strip 26. The cross strip 26 connects between the bars 22 and 24 and is located directly in front of the wheel 28. The wheel 28 is rotationally supported on the bars 22 and 24. The aft end of the bar 22 is formed into a handle 30. The aft end of the bar 24 is formed into a handle 32. By the user grasping onto the handles 30 and 32 and raise such, the wheelbarrow is caused to fulcrum about the wheel 28 until the cross strip 26 comes into contact with the resting surface 34 on which the wheelbarrow rests. At that particular time, the contents that are contained within the compartment 14 are free to be dumped out of the compartment 14 onto the resting surface 34.

Fixedly mounted to the bar 22 is a leg 36. Fixedly mounted to the bar 24 is a leg 38. The legs 36 and 38 are identical and each are formed basically channel shape having an exterior channel 40. Each leg 36 and 38 forms a base 42 that interconnects between the forward section and the aft section of each leg 36 and leg 38. It is the base 42 that would normally rest on the supporting surface 34.

Figure 3:
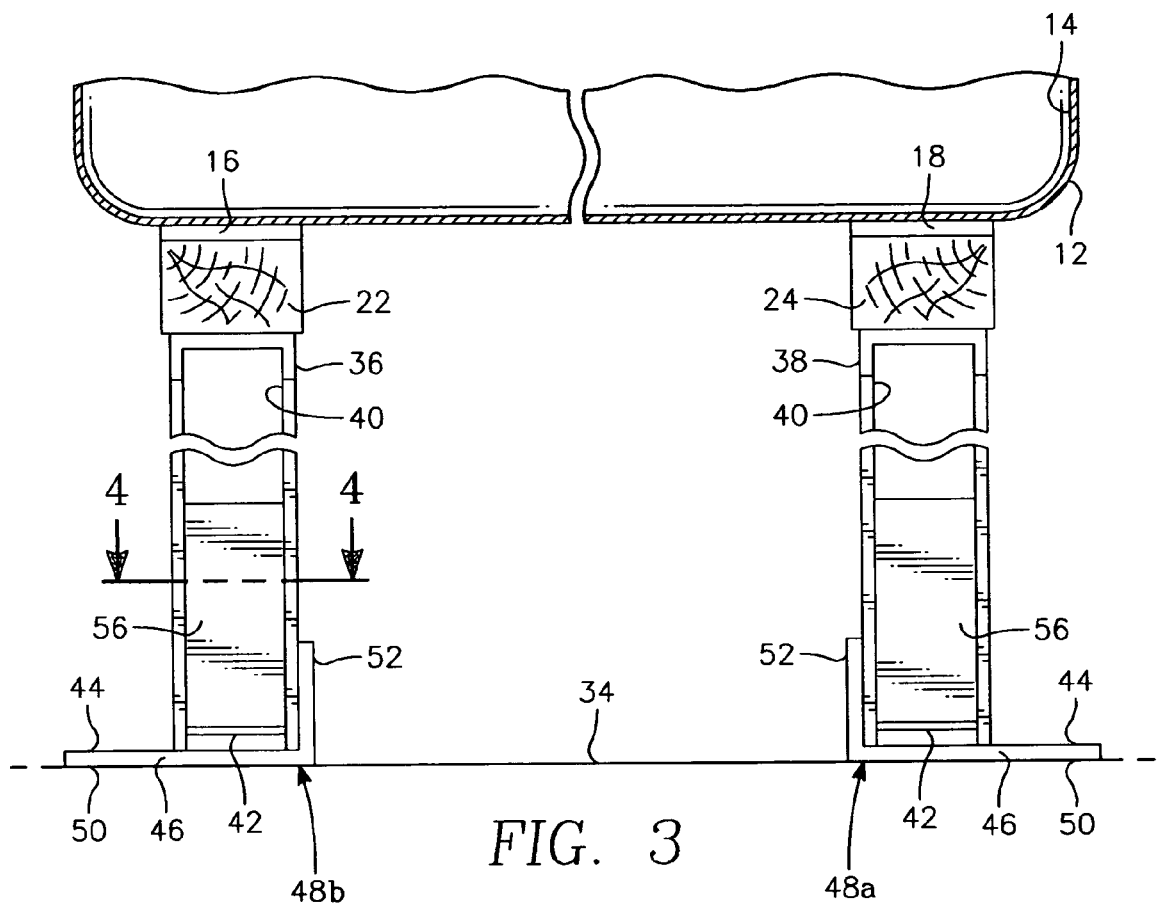
FIG. 3 is a rear elevational view cut through the handle structure of the wheelbarrow showing the mounting of each stabilizer in conjunction with each leg.
Figure 4:
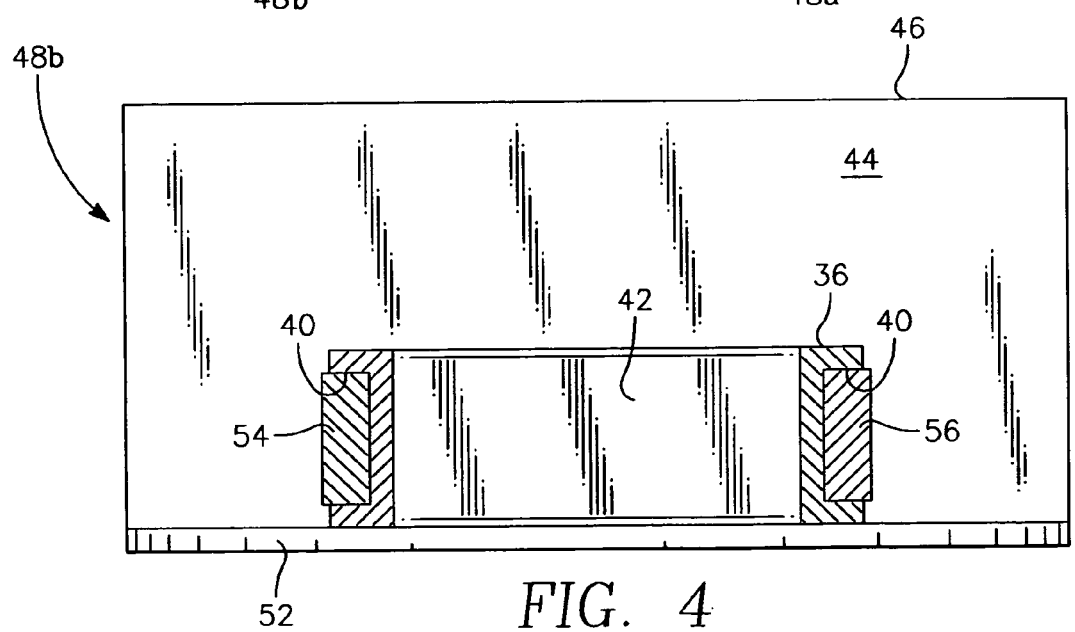
FIG. 4 is a cross-sectional view through one of the legs of the wheelbarrow taken along line 4—4 of FIG. 3.

However, the base 42 is designed to be fixedly secured onto the top surface 44 of a horizontal section 46 of a stabilizer 48a and 48b. The horizontal section 46 also includes a bottom surface 50. This bottom surface 50 is adapted to rest directly against the resting surface 34. The resting surface 34 can comprise dirt, cement, asphalt, rock, gravel, wood or any other type of surface. The base 42 of each leg 36 and 38 is to be fixedly secured as by welding onto the top surface 44 with it being understood that there is a completely separate stabilizer for each leg 36 and 38. Abutting against the interior surface of each of the legs 36 and 38, as is clearly shown in FIG. 3 of the drawings, is a vertical section 52. Each vertical section 52 is integral with its respective horizontal section 46 and located at ninety degrees relative thereto. The general configuration of the vertical section 52 is that of being rounded, however this shape may be varied without departing from the scope of this invention. Also, the basic shape of the horizontal section is that of being rectangular. However, that particular shape can also vary as a circular or oblong shape may be found to be desirable. The vertical section 52 is be fixedly secured to the interior surface of each leg 36 and 38 so as to provide a lateral support for each leg 36 and 38. Typically, each leg 36 and 38 will be welded or otherwise similarly secured not only to the horizontal section 46 but also to the vertical section 52. Typically, the material of construction for the stabilizer 48 will comprise one-eighth inch to one-quarter inch steel or aluminum plate. It is found to be best to locate the vertical section 52 against the interior surface of each of the legs 36 and 38 as previously mentioned but such could be locked against the exterior surface of the legs 36 and 38.

It is desirable to strengthen the construction of each of the legs 36 and 38. Relative to the base 42 of each leg 36 and 38 there is a forward section and an aft section of each leg. Within the forward section and the aft section there is located the channel 40. Within the channel 40 there is to be mounted strengthening plates 54 and 56. The strengthening plates 54 and 56 are to be permanently affixed relative to their respective leg 36 and 38 as by welding. Each of the strengthening plates 54 and 56 comprises a short length of plate, generally no more than three to six inches in length. It is to be understood that there are two in number of the strengthening plates 54 and 56 for each leg 36 and 38.

The overall result by using of the stabilizer structure of the present invention, the wheelbarrow 10 has significantly increased balance, and is very difficult to tip over. Also, the overall structure of the wheelbarrow 10 is substantially strengthened.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. In combination with a wheelbarrow, said wheelbarrow having a frame, a wheel mounted on said frame, handle structure mounted on said frame, a tray mounted on said frame, said tray adapted to support material to be moved, a pair of legs mounted on said frame, each of said legs being channel shaped forming a longitudinal channel with there being a forward facing channel and a rearward facing channel for each said leg, each of said legs having a base, said base adapted to rest on a supporting surface, the improvement comprising:

a stabilizer structure in the form of a pair of stabilizers, each said stabilizer being formed of a sheet material plate having a flat horizontal section and a vertical section with said vertical section located at a right angle to said horizontal section, said horizontal section having a top surface and a bottom surface, a said base of a said leg to be fixedly secured to said horizontal section at said top surface, there being a separate said stabilizer for each said leg;

each said leg having an inner surface and an outer surface, said inner surfaces of said legs facing each other, said vertical section of said stabilizer to abut against said interior surface of said leg, said vertical section having a rounded upper free edge to avoid sharp corners which could injure a user; and a strengthening plate nesting within each forward facing channel and said rearward facing channel of each said leg, each said strengthening plate being welded to its respective said leg, each said strengthening plate being within the range of three to six inches in length.

* * * * *